US012602920B2

(12) United States Patent
Deng

(10) Patent No.: US 12,602,920 B2
(45) Date of Patent: Apr. 14, 2026

(54) IMAGE RECOGNITION METHOD AND APPARATUS, ELECTRONIC DEVICE, AND COMPUTER-READABLE MEDIUM

(71) Applicant: BEIJING BYTEDANCE NETWORK TECHNOLOGY CO., LTD., Beijing (CN)

(72) Inventor: Qili Deng, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 18/019,050

(22) PCT Filed: Sep. 6, 2021

(86) PCT No.: PCT/CN2021/116717
§ 371 (c)(1),
(2) Date: Jan. 31, 2023

(87) PCT Pub. No.: WO2022/052889
PCT Pub. Date: Mar. 17, 2022

(65) Prior Publication Data
US 2023/0281983 A1 Sep. 7, 2023

(30) Foreign Application Priority Data
Sep. 10, 2020 (CN) .......................... 202010946640.7

(51) Int. Cl.
*G06V 10/00* (2022.01)
*G06V 10/75* (2022.01)
(Continued)

(52) U.S. Cl.
CPC ............ *G06V 10/84* (2022.01); *G06V 10/758* (2022.01); *G06V 10/764* (2022.01); *G06V 40/171* (2022.01)

(58) Field of Classification Search
CPC .... G06V 10/84; G06V 10/758; G06V 10/764; G06V 40/171; G06V 20/70; G06V 40/161
See application file for complete search history.

(56) References Cited

U.S. PATENT DOCUMENTS

2006/0228026 A1* 10/2006 Xiong .................. G06V 40/169
                                              382/181
2009/0087089 A1* 4/2009 Hu ........................ G06V 40/165
                                              382/165
(Continued)

FOREIGN PATENT DOCUMENTS

CN      103914699 A    7/2014
CN      106778613 A    5/2017
(Continued)

OTHER PUBLICATIONS

International Preliminary Report on Patentability for International Application No. PCT/CN2021/116717, mailed Mar. 23, 2023, 12 pages.
(Continued)

*Primary Examiner* — Md K Talukder
(74) *Attorney, Agent, or Firm* — BakerHostetler

(57) ABSTRACT

Disclosed in embodiments of the present invention are an image recognition method and apparatus, an electronic device, and a computer-readable medium. One specific embodiment of the method comprises: obtaining a target image with a mouth displayed; for each of preset at least three target categories, determining a probability that each pixel point in the target image is the target category, and obtaining at least three probability maps; and determining
(Continued)

the category of each pixel point in the target image on the basis of the at least three probability maps. According to the embodiment, the target image with the mouth displayed is classified into at least three target categories, so that the pixel points have more accurate categories, and the recognition of the edge of a target area in the image is more accurate.

19 Claims, 5 Drawing Sheets

(51) Int. Cl.
    *G06V 10/764*        (2022.01)
    *G06V 10/84*         (2022.01)
    *G06V 40/16*         (2022.01)

(56)                References Cited

U.S. PATENT DOCUMENTS

| | | | | |
|---|---|---|---|---|
| 2010/0284616 | A1* | 11/2010 | Dalton | G06T 7/136 |
| | | | | 382/167 |
| 2012/0327172 | A1* | 12/2012 | El-Saban | G06T 7/174 |
| | | | | 348/14.02 |
| 2015/0234942 | A1 | 8/2015 | Harmon | |
| 2018/0107660 | A1* | 4/2018 | Wang | G06F 16/5854 |
| 2018/0181803 | A1* | 6/2018 | Zhang | G06V 20/53 |
| 2019/0102603 | A1* | 4/2019 | Du | G06V 10/764 |
| 2020/0410213 | A1* | 12/2020 | Wang | G06N 3/084 |
| 2021/0127204 | A1* | 4/2021 | Porta | G06N 20/20 |
| 2021/0182537 | A1* | 6/2021 | Cao | G06V 10/82 |

FOREIGN PATENT DOCUMENTS

| | | | |
|---|---|---|---|
| CN | 106991423 | A | 7/2017 |
| CN | 108090503 | A | 5/2018 |
| CN | 108446659 | A | 8/2018 |
| CN | 109344752 | A | 2/2019 |
| CN | 109598304 | A | 4/2019 |
| CN | 110021050 | A | 7/2019 |
| CN | 112070034 | A | 12/2020 |

OTHER PUBLICATIONS

Notice of First Examination Opinion for Chinese Application No. 202010946640.7, mailed Feb. 18, 2023, 9 pages.
Notice of Second Examination Opinion for Chinese Application No. 202010946640.7, mailed May 11, 2023, 8 pages.
Rejection Decision for Chinese Application No. CN202010946640. 7, mailed Jul. 29, 2023, 6 pages.
Written Opinion for International Application No. PCT/CN2021/ 116717, mailed Nov. 25, 2021, 8 Pages.
International Patent Application No. PCT/CN2021/116717; Int'l Search Report; dated Nov. 25, 2021; 2 pages.

* cited by examiner

200

Obtain a target image displaying a
mouth

201

Determine, for each target category in
at least three target categories, a
probability that each pixel point in the
target image is the target category, to
obtain at least three probability graphs

202

Determine the category of each pixel
point in the target image based on the at
least three probability graphs

203

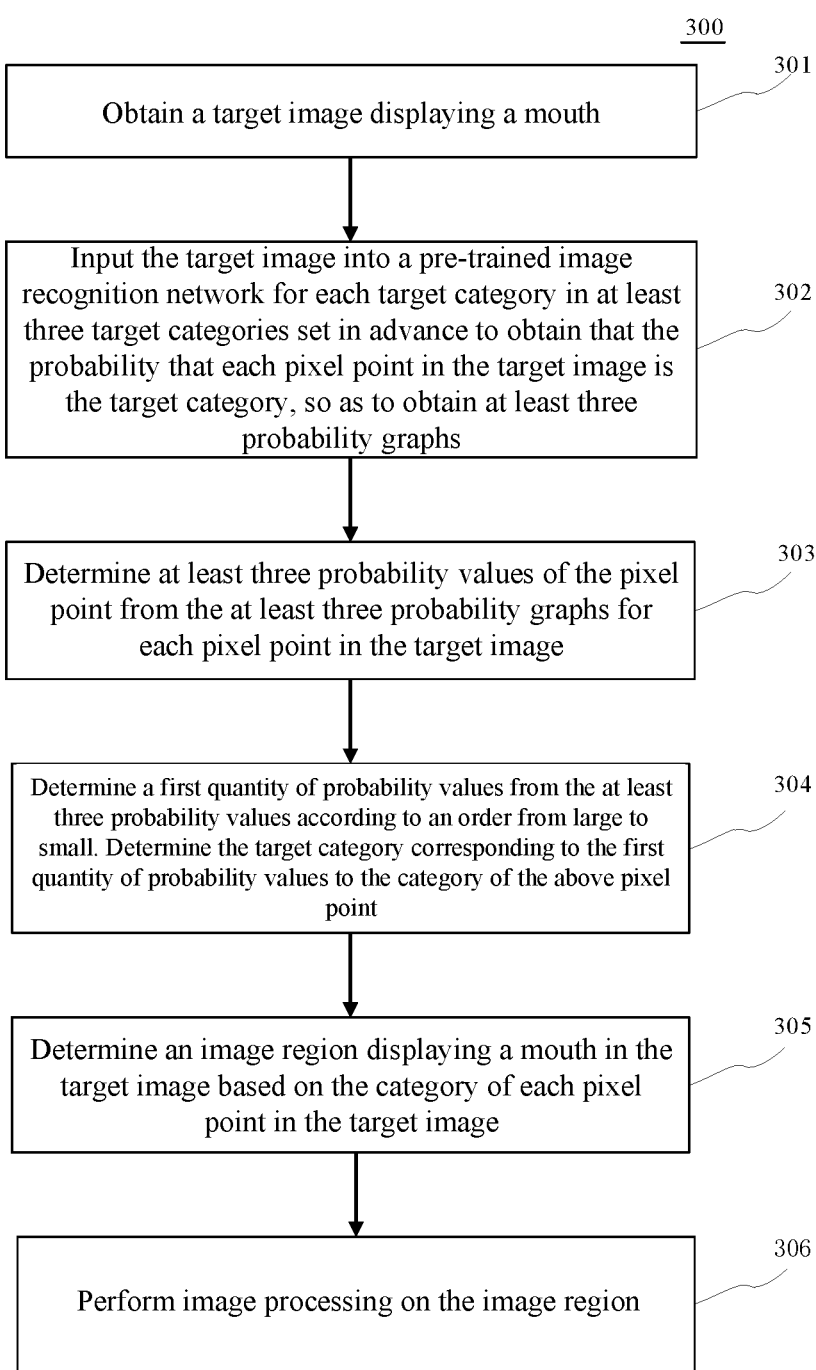

300

301

Obtain a target image displaying a mouth

302

Input the target image into a pre-trained image recognition network for each target category in at least three target categories set in advance to obtain that the probability that each pixel point in the target image is the target category, so as to obtain at least three probability graphs

303

Determine at least three probability values of the pixel point from the at least three probability graphs for each pixel point in the target image

304

Determine a first quantity of probability values from the at least three probability values according to an order from large to small. Determine the target category corresponding to the first quantity of probability values to the category of the above pixel point

305

Determine an image region displaying a mouth in the target image based on the category of each pixel point in the target image

306

Perform image processing on the image region

IMAGE RECOGNITION METHOD AND APPARATUS, ELECTRONIC DEVICE, AND COMPUTER-READABLE MEDIUM

CROSS-REFERENCE

This application is the U.S. National Stage of International Application No. PCT/CN2021/116717, filed on Sep. 6, 2021, which claims priority to Chinese patent application No. 202010946640.7 with a filing date of Sep. 10, 2020 and a title of "IMAGE RECOGNITION METHOD AND APPARATUS, ELECTRONIC DEVICE, AND COMPUTER-READABLE MEDIUM", both of which are incorporated herein by reference in their entireties.

FIELD

The embodiments of the present disclosure relate to the technical field of computers, in particular to an image recognition method and apparatus, an electronic device, and a computer-readable medium.

BACKGROUND

With the development of an artificial intelligence technology, an image recognition technology can be used to recognize a mouth in a target image, so as to process the above target image. For example, color switching is performed on a mouth region in the above target image.

An existing image recognition technology cannot accurately recognize an edge of the mouth displayed in the above target image, which will cause a poor effect in the subsequent processing of the mouth region shown in the image.

SUMMARY

The content section of this disclosure is used to present ideas in a brief form that will be described in detail in the specific embodiments section that follows. The content portion of this disclosure is not intended to identify key features or essential features of the claimed technical solution, nor is it intended to limit the scope of the claimed protected technical solution.

Some embodiments of the present disclosure propose image recognition method and apparatus, electronic device, and computer-readable media to solve the technical problems mentioned in the background technology section above.

In a first aspect, some embodiments of the present disclosure provide an image recognition method, comprising: obtaining a target image displaying a mouth; determining, for each target category in at least three target categories set in advance, a probability that each pixel point in the target image is the target category, to obtain at least three probability graphs; and determining the category of each pixel point in the target image based on the at least three probability graphs.

In a second aspect, some embodiments of the present disclosure provide an image recognition apparatus, comprising: an obtaining unit, configured to obtain a target image displaying a mouth; a first determining unit, configured to determine, for each target category in at least three target categories set in advance, a probability that each pixel point in the target image is the target category, to obtain at least three probability graphs; and a second determining unit, configured to determine the category of each pixel point in the target image based on the at least three probability graphs.

In a third aspect, some embodiments of the present disclosure provide an electronic device, comprising: one or more processors; and a storage apparatus storing one or more programs; wherein when the one or more programs are executed by the one or more processors, the one or more processors implement the method as described in any of the implementations of the first aspect.

In a fourth aspect, some embodiments of the present disclosure provide a computer-readable medium storing computer programs, wherein the programs implement the method as described in any of the implementations of the first aspect when executed by the processors.

One of embodiments of the present disclosure has the following beneficial effects: by using an image recognition method of some embodiments of the present disclosure, an edge of a mouth displayed in a target image can be more accurately recognized. Specifically, the inventor found that the reason for inaccurate recognition on the edge of the mouth displayed in the above target image by a relevant image recognition technology is that the relevant image recognition technology only performs binary classification (for example being divided into a mouth region pixel point and a non-mouth region pixel point) on the target image. Since the edge of the mouth is at a junction of a mouth region and a non-mouth region, the probability of belonging to the mouth region is low, and the above binary classification recognition technology easily recognizes it incorrectly. Based on this, the image recognition method of some embodiments of the present disclosure performs classification of at least three target categories on a target image showing with a mouth, so as to enable pixel points to have a more accurate category. For example, for an example image, a pixel point belonging to the non-mouth region pixel point in the binary classification will be accurately classified into a face region pixel point and a non-face region pixel point. On this basis, when the probability of a certain pixel point belonging to a target region pixel point is low, the certain pixel point may still be determined to be the target region pixel point. For example, for an example image, in binary classification, a classification result represents that the probability of a certain pixel point belonging to the mouth pixel point is 0.4, the probability of a certain pixel point belonging to the non-mouth pixel point is 0.6, and thus the pixel point will be determined to belong to the non-mouth pixel point. In ternary classification corresponding to binary classification, a classification result represents that the probability of the pixel point belonging to the mouth pixel point is 0.4, the probability of the pixel point belonging to the face region pixel point is 0.3, the probability of the pixel point belonging to the non-face region pixel point is 0.3, thus the pixel point will be determined to belong to the mouth pixel point. It can be seen that classification of at least three target categories is performed on the target image, so as to more accurately recognize an edge of a target region in the image.

BRIEF DESCRIPTION OF THE DRAWINGS

These and other features, advantages and aspects of embodiments of the present disclosure will become more apparent in conjunction with the accompanying drawings and with reference to the following specific embodiments. Throughout the accompanying drawings, identical or similar appended marks indicate identical or similar elements. It should be understood that the accompanying drawings are schematic and that the elements and components are not necessarily drawn to scale.

FIG. 3 is a flow diagram of some other embodiments of an image recognition method according to the present disclosure.

DETAILED DESCRIPTION OF THE EMBODIMENTS

Embodiments of the present disclosure will be described in greater detail below with reference to the accompanying drawings. While certain embodiments of the present disclosure are shown in the accompanying drawings, it should be understood, however, that the present disclosure may be implemented in various forms and should not be construed as limited to the embodiments set forth herein. Rather, these embodiments are provided for a more thorough and complete understanding of the present disclosure. It should be understood that the accompanying drawings and embodiments of the present disclosure are for exemplary purposes only and are not intended to limit the scope of protection of the present disclosure.

It is also noted that, for ease of description, only those portions of the accompanying drawings are shown that relate to the invention in question. The embodiments and features of the embodiments in the present disclosure may be combined with each other, provided that there is no conflict.

Note that the concepts "first", "second", etc., mentioned in this disclosure are used only to distinguish between different devices, modules or units, and are not intended to limit the order or interdependence of the functions performed by these devices, modules or units.

It should be noted that the modifications of "one" and "more than one" mentioned in this disclosure are schematic and not limiting, and it should be understood by those skilled in the art that unless the context clearly indicates otherwise, they should be understood as "one or more" unless the context clearly indicates otherwise.

The names of the messages or information interacting between the plurality of devices in this disclosure are for illustrative purposes only and are not intended to limit the scope of those messages or information.

The present disclosure will be described in detail below with reference to the accompanying drawings and in conjunction with embodiments.

Figure 1:
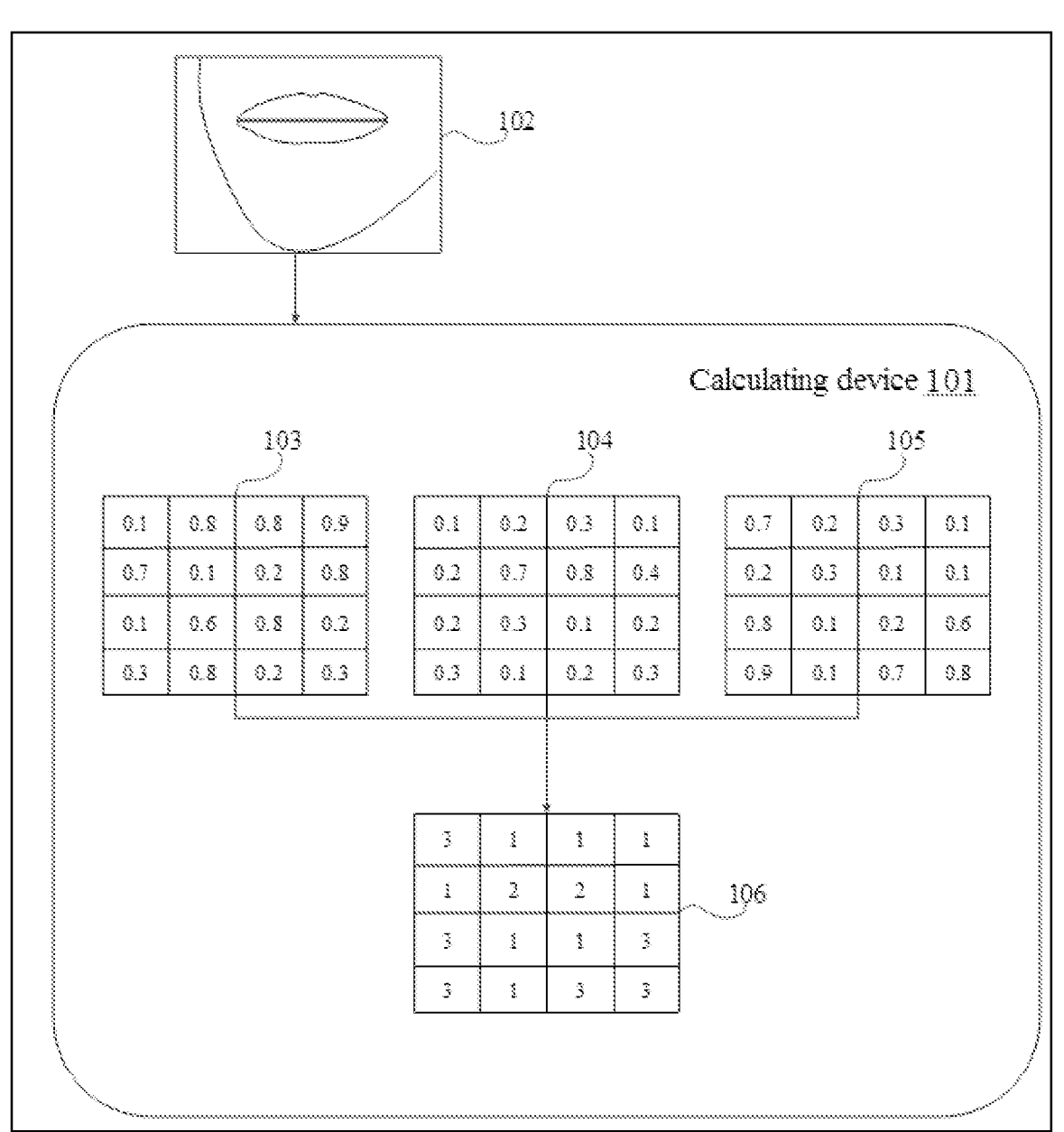
FIG. 1 is a schematic diagram of an application scene of an image recognition method according to some embodiments of the present disclosure.

FIG. 1 illustrates a schematic diagram of an application scene where an image recognition method of some embodiments of the present disclosure may be applied.

In the application scene as shown in FIG. 1, first, a calculating device 101 may obtain a target image 102 displaying a mouth. In the application scene, the target image 102 includes 16 pixel points. Specifically, each row includes four pixel points, and there are four rows in total. Then, the calculating device 101 may determine a probability that each pixel point in the above target image is the above target category for each target category in at least three target categories set in advance to obtain at least three probability graphs. In the application scene, there are three target categories, including: a face pixel point, a mouth pixel point and a background pixel point, corresponding to a probability graph 103, a probability graph 104 and a probability graph 105 respectively. Finally, the calculating device 101 may determine the category of each pixel point in the above target image based on the above three probability graphs, as shown in a figure numeral 106. The pixel point numbered as 1 is the face pixel point, the pixel point numbered as 2 is the mouth pixel point, and the pixel point numbered as 3 is the background pixel point.

It should be noted that the above calculating device 101 may be hardware, or also may be software. When the calculating device is the hardware, it may be implemented into a distributed cluster composed of a plurality of servers or electronic devices, or may also be implemented into a single server or a single electronic device. When the calculating device is the software, it may be implemented into, for example, a plurality of software or software modules used for providing distributed services, or may also be implemented into single software or a software module, which is not specifically limited here.

It should be understood that the quantity of calculating device 101 in FIG. 1 is only schematic. According to implementation demands, the calculating device 101 with any quantity may be provided.

Figure 2:
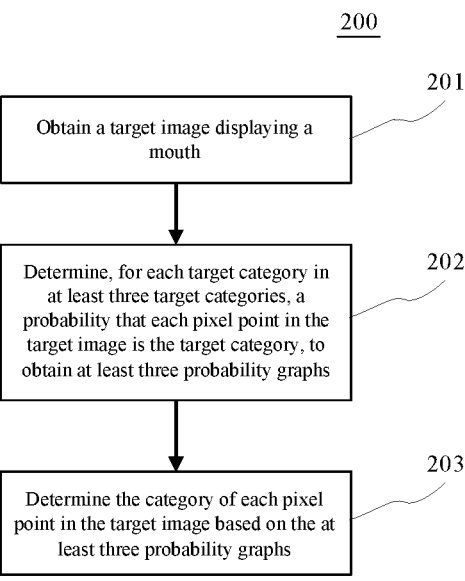
FIG. 2 is a flow diagram of some embodiments of an image recognition method according to the present disclosure.

Further referring to FIG. 2 which illustrates a flow 200 of an image recognition method according to some embodiments of the present disclosure. The image recognition method includes the following steps:

Step 201, a target image displaying a mouth is obtained.

In some embodiments, an executive body (such as the calculating device as shown in FIG. 1) of the image recognition method may obtain the target image displaying the mouth in a wired connection mode or a wireless connection mode. It needs to be indicated that the above wireless connection mode may include but not limited to 3G/4G connection, WiFi connection, Bluetooth connection, WiMAX connection, Zigbee connection, ultra wideband (UWB) connection, and other wireless connection modes known at present or developed in the future.

In some embodiments, the above target image may be any image displaying a mouth, for example, an image displaying a mouth and shot by a user at present, and an image displaying a mouth and selected from local historical images by the user.

Step 202, for each target category in at least three target categories set in advance, it is determined a probability that each pixel point in the above target image is the above target category to obtain at least three probability graphs.

In some embodiments, the above executive body may determine the probability that each pixel point in the above target image to be the above target category by using existing image recognition software or an on-line image recognition tool to obtain the at least three probability graphs, specifically, for each target category, the above executive body may replace a pixel value of each pixel point in the above target image with the probability of the pixel point being the target category to obtain a probability graph corresponding to the category.

In some optional implementations of some embodiments, the above executive body may also input the above target image into a pre-trained image recognition network to obtain that each pixel point in the above target image is the probability of the category, so as to obtain at least three probability graphs.

In some embodiments, the above at least three target categories may include a face region pixel point, a non-face region pixel point and a mouth pixel point.

In some optional implementations of some embodiments, the above at least three target categories may further include a mouth pixel point, a mouth internal pixel point, a face region pixel point and a non-face region pixel point. These embodiments adopting the implementation may recognize a non-face region, namely, a shielded region, existing in a region where a face is displayed by recognizing the face region pixel point and the non-face region pixel point, so as to accurately recognize the mouth displayed in the above target image when the shielded region exists in the above target image. In addition, by recognizing a mouth internal region, the mouth region and the mouth internal region may be distinguished, so as to provide convenience for individually performing image processing on any one of the mouth region and the mouth internal region subsequently.

Step 203, based on the above at least three probability graphs, the category of each pixel point in the above target image is determined.

In some embodiments, the above executive body may determine the target category corresponding to the biggest of at least three probability values corresponding to the above pixel point to be the category of the above pixel point for each pixel point in the above target image.

In some optional implementations of some embodiments, the above executive body may further determine the category of each pixel point in the above target image through the following steps:

Step 1, for each pixel point in the above target image, the at least three probability values of the above pixel point are determined in the above at least three probability graphs.

Step 2, a first quantity of probability values is determined from the above at least three probability values according to an order from large to small.

Step 3, the target category corresponding to the above first quantity of probability value is determined to be the category of the above pixel point.

According to the method provided by some embodiments of the present disclosure, the target image displaying the mouth is classified with at least three target categories, so as to enable the pixel point to have the more accurate category, and then the edge of the target region in the image is recognized more accurately.

Further referring to FIG. 3, which illustrates a flow 300 of an image recognition method according to some other embodiments. The flow 300 of the image recognition method includes the following steps:

Step 301, the target image displaying the mouth is obtained.

In some embodiments, specific implementation and technical effects brought thereby may refer to step 201 of embodiments corresponding to FIG. 2, which is not repeated here.

Step 302, for each target category in the at least three target categories set in advance, the above target image is input into the pre-trained image recognition network to obtain the probability that each pixel point in the above target image is the above target category, so as to obtain the at least three probability graphs.

Step 303, for each pixel point in the above target image, the at least three probability values of the above pixel point are determined in the above at least three probability graphs.

Step 304, the first quantity of probability values is determined from the above at least three probability values according to an order from large to small.

In some embodiments, according to actual requirement, the above first quantity may be any numerical value, for example, the first quantity may be one.

Step 305, the target category corresponding to the probability value of the above first quantity is determined to be the category of the above pixel point.

Step 306, based on the category of each pixel point in the above target image, the image region displaying the mouth in the above target image is determined.

In some embodiments, the above executive body may determine the region formed by the pixel point with the category being the mouth pixel point to be the above image region.

In some embodiments, the above executive body may further determine the region formed by the pixel point with the category being the mouth pixel point or the mouth internal pixel point to be the above image region.

Step 307, image processing is performed on the above image region.

In some embodiments, processing of the above executive body on the above image region may include: performing color switching on the above image region, tailoring the above image region and the like.

It can be seen from FIG. 3 that, compared with the description of some embodiments corresponding to FIG. 2, the flow 300 of the image recognition method in embodiments corresponding to FIG. 3 embodies that the target image is input into the image recognition network, so as to obtain the probability graphs and steps for processing the target image. Therefore, the solution described by these embodiments may determine the category of the target image more accurately. In addition, the target image is processed to be richer, thereby improving the experience of the user watching the above target image.

Figure 4:
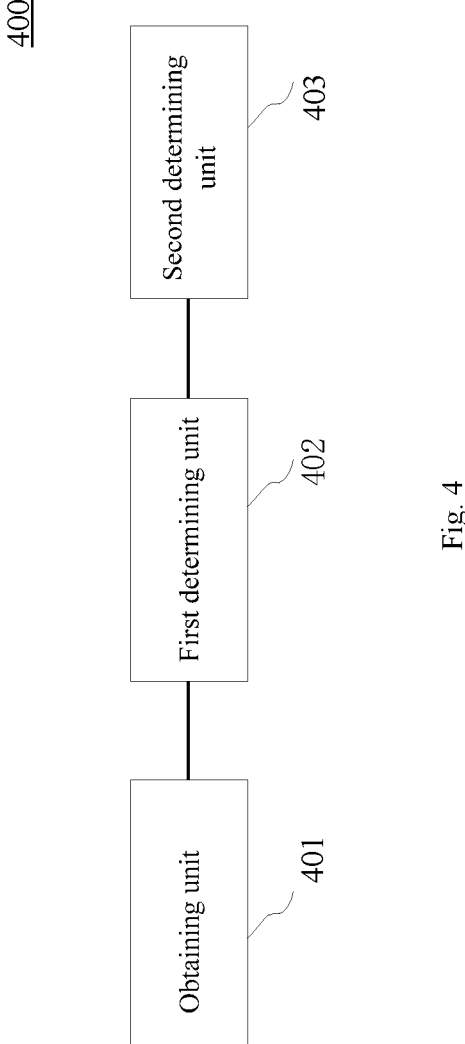
FIG. 4 is a schematic structural diagram of some embodiments of an image recognition apparatus according to the present disclosure.

Further referring to FIG. 4, as the implementation of methods as shown in the above drawings, the present disclosure provides some embodiments of an image recognition apparatus, these embodiments of the apparatus correspond to those methods as shown in FIG. 2, and the apparatus may be specifically applied to various electronic devices.

As shown in FIG. 4, an image recognition apparatus 400 of some embodiments includes: an obtaining unit 401, a first determining unit 402 and a second determining unit 403. The obtaining unit 401 is configured to obtain a target image displaying a mouth; the first determining unit 402 is configured to determine a probability that each pixel point in the above target image is the above target category for each target category in at least three target categories set in advance to obtain at least three probability graphs; and the second determining unit 403 is configured to determine the category of each pixel point in the above target image based on the above at least three probability graphs.

In some optional implementations of some embodiments, the above at least three target categories include: a mouth pixel point, a mouth internal pixel point, a face region pixel point and a non-face region pixel point.

In some optional implementations of some embodiments, the first determining unit 402 is further configured to input the above target image into a pre-trained image recognition network to obtain the probability that each pixel point in the above target image is the above target category, so as to obtain at least three probability graphs.

In some optional implementations of some embodiments, the second determining unit 403 is further configured to determine the at least three probability values of the above pixel point in the above at least three probability graphs for each pixel point in the above target image; according to an order from large to small, determine the first quantity of probability values from the at least three probability values; and determine the target categories corresponding to the first quantity of probability values to be the category of the above pixel point.

In some optional implementations of some embodiments, the apparatus 400 further includes a processing unit, configured to determine an image region displaying a mouth in the above target image based on the category of each pixel point in the above target image; and perform image processing on the above image region.

It should be understood that the units recorded in the apparatus 400 correspond to the steps of the method described in FIG. 2. Therefore, the operation, features and generated beneficial effects described above for the method also apply to the apparatus 400 and the units contained therein, which is not repeated here.

Figure 5:
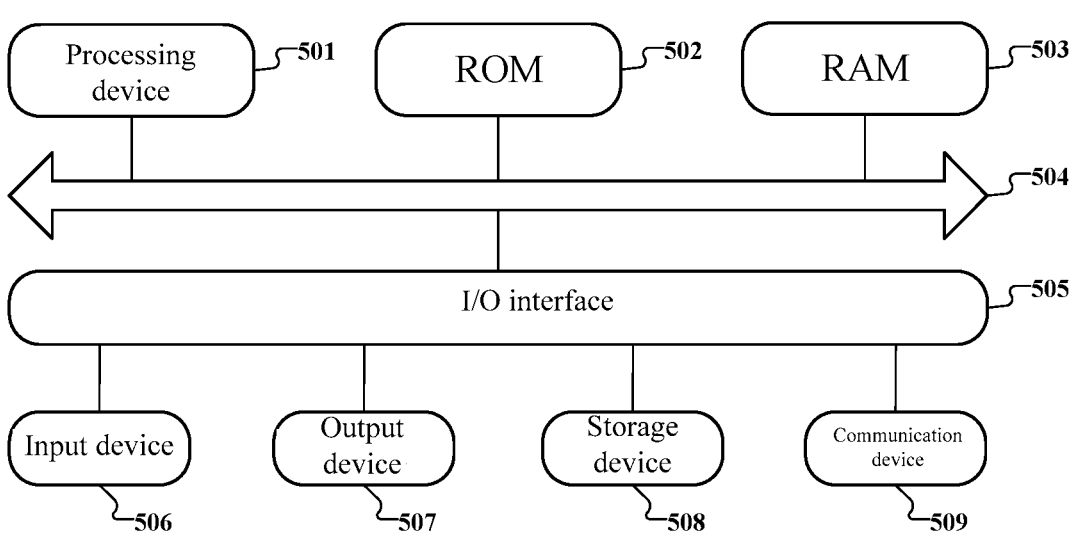
FIG. 5 is a schematic structural diagram suitable for implementing some embodiments of an electronic device of the present disclosure.

Reference is made below to FIG. 5, which illustrates a schematic diagram of the structure of an electronic device (e.g., the server or terminal device in FIG. 1) 500 suitable for use in implementing some embodiments of the present disclosure. Electronic devices in some embodiments of the present disclosure may include, but are not limited to, mobile terminals such as a cell phone, a laptop computer, a digital radio receiver, a PDA (personal digital assistant), a PAD (tablet computer), a PMP (portable multimedia player), an in-vehicle terminal (e.g., an in-vehicle navigation terminal), and the like, and fixed terminals such as a digital TV, a desktop computer, and the like. The electronic device illustrated in FIG. 5 is only an example and should not impose any limitations on the functionality and scope of use of embodiments of the present disclosure.

As shown in FIG. 5, the electronic device 500 may include a processing device (e.g., central processor, graphics processor, etc.) 501 that may perform various appropriate actions and processes based on programs stored in a read-only memory (ROM) 502 or loaded from a storage device 508 into a random access memory (RAM) 503. In RAM 503, various programs and data required for the operation of electronic device 500 are also stored. The processing device 501, ROM 502, and RAM 503 are connected to each other via bus 504. The input/output (I/O) interface 505 is also connected to the bus 504.

Typically, the following devices can be connected to the I/O interface 505: input device 506 including, for example, a touch screen, touch pad, keyboard, mouse, camera, microphone, accelerometer, gyroscope, etc.; output device 507 including, for example, liquid crystal displays (LCDs), speakers, vibrators, etc.; storage device 508 including, for example, magnetic tapes, hard drives, etc.; and communication device 509. communication device 509 may allow the electronic device 500 to communicate wirelessly or wired with other devices to exchange data. While FIG. 5 illustrates the electronic device 500 with various devices, it should be understood that it is not required to implement or have all of the devices illustrated. More or fewer devices may alternatively be implemented or available. Each box illustrated in FIG. 5 may represent a single device, or multiple devices as desired.

In particular, according to some embodiments of the present disclosure, the process described above with reference to the flowchart may be implemented as a computer software program. For example, some embodiments of the present disclosure include a computer program product comprising a computer program carried on a computer readable medium, the computer program comprising program code for performing the method shown in the flowchart. In some such embodiments, the computer program may be downloaded and installed from a network via a communication device 509, or from a storage device 508, or from a ROM 502. When this computer program is executed by processing device 501, it performs the above-described functions as defined in the methods of some embodiments of the present disclosure.

It is to be noted that the computer readable medium described in some embodiments of the present disclosure may be a computer readable signal medium or a computer readable storage medium or any combination of the foregoing. The computer readable storage medium may be, for example—but not limited to—an electrical, magnetic, optical, electromagnetic, infrared, or semiconductor system, device, or device, or any combination of the above. More specific examples of computer-readable storage media may include, but are not limited to: electrically connected with one or more wires, portable computer disks, hard disks, random access memory (RAM), read-only memory (ROM), erasable programmable read-only memory (EPROM or flash memory), optical fiber, portable compact disk read-only memory (CD-ROM), optical storage devices, or any of the above. magnetic memory devices, or any suitable combination of the foregoing. In some embodiments of the present disclosure, the computer-readable storage medium may be any tangible medium that contains or stores a program that may be used by or in combination with an instruction execution system, device, or device. And in some embodiments of the present disclosure, the computer readable signaling medium may include a data signal propagated in the baseband or as part of a carrier wave carrying a computer readable program code. Such propagated data signals may take a variety of forms, including but not limited to electromagnetic signals, optical signals, or any suitable combination of the foregoing. Computer-readable signal medium can also be any computer-readable medium other than computer-readable storage media, the computer-readable signal medium can send, propagate or transmit the program for use by or in conjunction with the instruction execution system, device or device. The program code contained on the computer-readable medium may be transmitted by any suitable medium, including but not limited to: wire, fiber optic cable, RF (radio frequency), etc., or any suitable combination of the above.

In some implementations, the client, server may communicate using any currently known or future developed network protocol such as HTTP (HyperText Transfer Protocol), and may interconnect with any form or medium of digital data communication (e.g., a communication network). Examples of communication networks include local area networks ("LAN"), wide area networks ("WAN"), internetworks (e.g., the Internet), and end-to-end networks (e.g., ad hoc end-to-end networks), as well as any currently known or future developed networks.

The above-mentioned computer-readable medium may be included in the above-mentioned electronic device; or may be separate and not assembled into the electronic device. The above computer readable medium carries one or more programs that, when the above one or more programs are executed by the electronic device, cause the electronic device to: acquire a target image showing a mouth portion; determine, for each of at least three predetermined target categories, the probability that each pixel point in the above target image is in the above target category, obtaining at least three probability maps; and, based on the above at least three probability maps, determining the category of each pixel point in the above target image based on the above at least three probability maps.

Computer program code for performing the operations of some embodiments of the present disclosure may be written in one or more programming languages or combinations thereof, said programming languages including object-oriented programming languages—such as Java, Smalltalk, C++, and also including conventional procedural programming languages—such as "C" or the like. such as "C" language or similar programming languages. The program code may be executed entirely on the user's computer, partially on the user's computer, as a stand-alone package, partially on the user's computer and partially on a remote computer, or entirely on a remote computer or server. In the case involving a remote computer, the remote computer may be connected to the user computer via any kind of network—including a local area network (LAN) or wide area network (WAN)—or, alternatively, may be connected to an external computer (e.g., using an Internet service provider to connect via the Internet).

The flowcharts and block diagrams in the accompanying drawings illustrate the possible implementations of the architecture, functionality, and operation of systems, methods, and computer program products in accordance with various embodiments of the present disclosure. At this point, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the function involved. Note also that each box in the block diagram and/or flowchart, and the combination of boxes in the block diagram and/or flowchart, may be implemented with a dedicated hardware-based system that performs the specified function or operation, or may be implemented with a combination of dedicated hardware and computer instructions.

The units described in some embodiments of the present disclosure may be implemented by means of software or may be implemented by means of hardware. The units described may also be provided in a processor, for example, a processor may be described as comprising an acquisition unit, a first determination unit, and a second determination unit. For example, the acquisition unit may also be described as "a unit for acquiring a target image".

The functions described above herein may be performed, at least in part, by one or more hardware logic components. For example, non-limitingly, exemplary types of hardware logic components that may be used include: field-programmable gate arrays (FPGAs), application-specific integrated circuits (ASICs), application-specific standard products (ASSPs), systems-on-chip (SOCs), complex programmable logic devices (CPLDs), and the like.

According to one or more embodiments of the present disclosure, provide an image recognition method, comprising: obtaining a target image displaying a mouth; determining, for each target category in at least three target categories set in advance, a probability that each pixel point in the target image is the target category, to obtain at least three probability graphs; and determining the category of each pixel point in the target image based on the at least three probability graphs.

According to one or more embodiments of the present disclosure, the above at least three target categories comprise: a mouth pixel point, a mouth internal pixel point, a face region pixel point and a non-face region pixel point.

According to one or more embodiments of the present disclosure, the determining a probability that each pixel point in the target image is the target category, to obtain at least three probability graphs comprises: inputting the target image into a pre-trained image recognition network to obtain the probability that each pixel point in the target image is the target category, so as to obtain the at least three probability graphs.

According to one or more embodiments of the present disclosure, the above determining the category of each pixel point in the target image based on the at least three probability graphs comprises: determining, for each pixel point in the target image, at least three probability values of the pixel point in the at least three probability graphs; determining a first quantity of probability values from the at least three probability values according to an order from large to small; and determining the target category corresponding to the first quantity of probability values to be the category of the pixel point.

According to one or more embodiments of the present disclosure, the method further comprising: determining an image region displaying a mouth in the target image based on the category of each pixel point in the target image; and performing image processing on the image region.

According to one or more embodiments of the present disclosure, provide an image recognition apparatus, comprising: an obtaining unit, configured to obtain a target image displaying a mouth; a first determining unit, configured to determine, for each target category in at least three target categories set in advance, a probability that each pixel point in the target image is the target category, to obtain at least three probability graphs; and a second determining unit, configured to determine the category of each pixel point in the target image based on the at least three probability graphs.

According to one or more embodiments of the present disclosure, the above at least three target categories comprise: a mouth pixel point, a mouth internal pixel point, a face region pixel point and a non-face region pixel point.

According to one or more embodiments of the present disclosure, the above first determining unit is further configured to: input the target image into a pre-trained image recognition network to obtain the probability that each pixel point in the target image is the target category, so as to obtain the at least three probability graphs.

According to one or more embodiments of the present disclosure, the second determining unit is further configured to determine the at least three probability values of the above pixel point in the above at least three probability graphs for each pixel point in the above target image; according to an order from large to small, determine the first quantity of probability values from the at least three probability values; and determine the target categories corresponding to the first quantity of probability values to be the category of the above pixel point.

According to one or more embodiments of the present disclosure, the apparatus further includes a processing unit, configured to determine an image region displaying a mouth in the above target image based on the category of each pixel point in the above target image; and perform image processing on the above image region.

According to one or more embodiments of the present disclosure, provide an electronic device, comprising: one or more processors; and a storage apparatus storing one or more programs; wherein when the one or more programs are executed by the one or more processors, the one or more processors implement a method such as any of above.

According to one or more embodiments of the present disclosure, provide a computer-readable medium storing computer programs, wherein the programs implement a method such as any of above when executed by the processors.

The above description is only a description of some preferred embodiments of the present disclosure and of the technical principles applied. It should be understood by those skilled in the art that the scope of the invention covered by the embodiments of the present disclosure is not limited to technical solutions resulting from a particular combination of the above technical features, but should also cover other technical solutions resulting from any combination of the above technical features or their equivalent features without departing from the above inventive concept. For example, the above features are interchangeable with (but not limited to) technical features with similar functions disclosed in the embodiments of the present disclosure.

What is claimed is:

1. A method of improving an accuracy of recognizing an edge of a mouth in a target image, comprising:
   obtaining the target image;
   determining a probability that each pixel point in the target image belongs to each of at least three target categories, wherein the at least three target categories comprise a category of face region, a category of mouth region, and a category of non-face background, and wherein the determining a probability that each pixel point in the target image belongs to each of at least three target categories comprises:
      determining a first probability of each pixel point in the target image belonging to the category of face region,
      determining a second probability of each pixel point in the target image belonging to the category of mouth region, and
      determining a third probability of each pixel in the target image belonging to the category of non-face background;
   generating at least three probability graphs based on the first probability, the second probability, and the third probability of each pixel point in the target image belonging to the category of face region, the category of mouth region, and the category of non-face background, respectively; and
   determining a category of each pixel point in the target image based on the at least three probability graphs to improve the accuracy of recognizing the edge of the mouth in the target image.

2. The method according to claim 1, wherein the at least three target categories further comprise a category of mouth internal region.

3. The method according to claim 2, wherein the determining the category of each pixel point in the target image based on the at least three probability graphs comprises:
   determining, for each pixel point in the target image, at least three probability values of the pixel point in the at least three probability graphs;

determining a first quantity of probability values from the at least three probability values according to an order from large to small; and
determining the target category corresponding to the first quantity of probability values to be the category of the pixel point.

4. The method according to claim 2, further comprising:
determining an image region displaying the mouth in the target image based on the category of each pixel point in the target image; and
performing image processing on the image region.

5. The method according to claim 1, wherein the determining a probability that each pixel point in the target image belongs to each of at least three target categories comprises:
   inputting the target image into a pre-trained image recognition network to obtain the probability that each pixel point in the target image belongs to each of at least three target categories.

6. The method according to claim 5, wherein the determining the category of each pixel point in the target image based on the at least three probability graphs comprises:
   determining, for each pixel point in the target image, at least three probability values of the pixel point in the at least three probability graphs;
   determining a first quantity of probability values from the at least three probability values according to an order from large to small; and
   determining the target category corresponding to the first quantity of probability values to be the category of the pixel point.

7. The method according to claim 5, further comprising:
determining an image region displaying the mouth in the target image based on the category of each pixel point in the target image; and
performing image processing on the image region.

8. The method according to claim 1, wherein the determining the category of each pixel point in the target image based on the at least three probability graphs comprises:
   determining, for each pixel point in the target image, at least three probability values of the pixel point in the at least three probability graphs;
   determining a first quantity of probability values from the at least three probability values according to an order from large to small; and
   determining the target category corresponding to the first quantity of probability values to be the category of the pixel point.

9. The method according to claim 1, further comprising:
determining an image region displaying the mouth in the target image based on the category of each pixel point in the target image; and
performing image processing on the image region.

10. An electronic device, comprising:
one or more processors; and
a storage apparatus storing one or more programs; wherein
when the one or more programs are executed by the one or more processors, the one or more processors implement operations comprising:
obtaining a target image;
determining a probability that each pixel point in the target image belongs to each of at least three target categories, wherein the at least three target categories comprise a category of face region, a category of mouth region, and a category of non-face background, and wherein the determining a probability that each pixel point in the target image belongs to each of at least three target categories comprises:

determining a first probability of each pixel point in the target image belonging to the category of face region, determining a second probability of each pixel point in the target image belonging to the category of mouth region, and determining a third probability of each pixel in the target image belonging to the category of non-face background;

generating at least three probability graphs based on the first probability, the second probability, and the third probability of each pixel point in the target image belonging to the category of face region, the category of mouth region, and the category of non-face background, respectively; and determining a category of each pixel point in the target image based on the at least three probability graphs to improve an accuracy of recognizing an edge of a mouth in the target image.

11. The electronic device according to claim 10, wherein the at least three target categories further comprise a category of mouth internal region.

12. The electronic device according to claim 10, wherein the determining a probability that each pixel point in the target image belongs to each of at least three target categories comprises:

inputting the target image into a pre-trained image recognition network to obtain the probability that each pixel point in the target image belongs to each of at least three target categories.

13. The electronic device according to claim 10, wherein the determining the category of each pixel point in the target image based on the at least three probability graphs comprises:

determining, for each pixel point in the target image, at least three probability values of the pixel point in the at least three probability graphs;

determining a first quantity of probability values from the at least three probability values according to an order from large to small; and determining the target category corresponding to the first quantity of probability values to be the category of the pixel point.

14. The electronic device according to claim 10, the operations further comprising:

determining an image region displaying the mouth in the target image based on the category of each pixel point in the target image; and performing image processing on the image region.

15. A non-transitory computer-readable medium storing computer programs, wherein the programs implement operations when executed by the processors, the operations comprising:

obtaining a target image;

determining a probability that each pixel point in the target image belongs to each of at least three target categories, wherein the at least three target categories comprise a category of face region, a category of mouth region, and a category of non-face background, and wherein the determining a probability that each pixel point in the target image belongs to each of at least three target categories comprises:

determining a first probability of each pixel point in the target image belonging to the category of face region, determining a second probability of each pixel point in the target image belonging to the category of mouth region, and determining a third probability of each pixel in the target image belonging to the category of non-face background;

generating at least three probability graphs based on the first probability, the second probability, and the third probability of each pixel point in the target image belonging to the category of face region, the category of mouth region, and the category of non-face background, respectively; and determining a category of each pixel point in the target image based on the at least three probability graphs to improve an accuracy of recognizing an edge of a mouth in the target image.

16. The non-transitory computer-readable medium according to claim 15, wherein the at least three target categories further comprise a category of mouth internal region.

17. The non-transitory computer-readable medium according to claim 15, wherein the determining a probability that each pixel point in the target image belongs to each of at least three target categories comprises:

inputting the target image into a pre-trained image recognition network to obtain the probability that each pixel point in the target image belongs to each of at least three target categories.

18. The non-transitory computer-readable medium according to claim 15, wherein the determining the category of each pixel point in the target image based on the at least three probability graphs comprises:

determining, for each pixel point in the target image, at least three probability values of the pixel point in the at least three probability graphs;

determining a first quantity of probability values from the at least three probability values according to an order from large to small; and determining the target category corresponding to the first quantity of probability values to be the category of the pixel point.

19. The non-transitory computer-readable medium according to claim 15, the operations further comprising:

determining an image region displaying the mouth in the target image based on the category of each pixel point in the target image; and performing image processing on the image region.

* * * * *